United States Patent
Wee et al.

(10) Patent No.: US 9,391,514 B2
(45) Date of Patent: Jul. 12, 2016

(54) DEVICE FOR CONTROLLING A SWITCHING MODE POWER SUPPLY

(75) Inventors: Jae-Kyung Wee, Seoul (KR); Ji-Hoon Lim, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 166 days.

(21) Appl. No.: 14/354,627

(22) PCT Filed: Oct. 31, 2011

(86) PCT No.: PCT/KR2011/008215
§ 371 (c)(1),
(2), (4) Date: Apr. 28, 2014

(87) PCT Pub. No.: WO2013/062164
PCT Pub. Date: May 2, 2013

(65) Prior Publication Data
US 2014/0266121 A1   Sep. 18, 2014

(30) Foreign Application Priority Data
Oct. 28, 2011 (KR) .......... 10-2011-0111080

(51) Int. Cl.
| | |
|---|---|
| *H02M 3/157* | (2006.01) |
| *H02M 3/158* | (2006.01) |
| *H02M 1/00* | (2006.01) |

(52) U.S. Cl.
CPC ............ *H02M 3/157* (2013.01); *H02M 3/1588* (2013.01); *H02M 2001/0012* (2013.01); *Y02B 70/1466* (2013.01)

(58) Field of Classification Search
CPC .............. H02M 3/157; H02M 3/1588; H02M 2001/0012
USPC .......... 323/283, 284, 242, 205–211; 327/176, 327/277
See application file for complete search history.

(56) References Cited

U.S. PATENT DOCUMENTS

| | | | |
|---|---|---|---|
| 6,850,046 B2 * | 2/2005 | Chapuis | H02M 3/157 323/282 |
| 7,315,151 B2 * | 1/2008 | Thompson | G05F 1/613 323/223 |

(Continued)

FOREIGN PATENT DOCUMENTS

| | | |
|---|---|---|
| CN | 1834825 A | 9/2006 |
| CN | 1926490 A | 3/2007 |

(Continued)

*Primary Examiner* — Gary L Laxton
*Assistant Examiner* — Kyle J Moody
(74) *Attorney, Agent, or Firm* — Novick, Kim & Lee, PLLC; Sang Ho Lee

(57) ABSTRACT

An apparatus for controlling an output voltage of a switching mode power supply (SMPS) by adjusting a switching duty ratio is provided. A comparator outputs a state signal varying depending on a comparison result between an output voltage of the SMPS and a reference voltage. A clock generator generates an internal chip operating frequency and a switching frequency of the SMPS. A digital controller determines on/off of current cells depending on the state signal input from the comparator. A digital pulse width modulator (DPWM) determines a duty ratio of a digital pulse width modulation signal by determining a charging/discharging time of an internal capacitor based on an amount of current of the current cell.

12 Claims, 12 Drawing Sheets

(56) References Cited

U.S. PATENT DOCUMENTS

| | | | |
|---|---|---|---|
| 7,595,686 B2 * | 9/2009 | Maksimovic | G04F 10/005 327/176 |
| 2007/0290894 A1 | 12/2007 | Ng et al. | |
| 2008/0024104 A1 * | 1/2008 | Yamada | H02M 3/156 323/283 |
| 2013/0307615 A1 * | 11/2013 | Kuttner | H02M 3/157 330/127 |

FOREIGN PATENT DOCUMENTS

| | | |
|---|---|---|
| CN | 102141817 A | 8/2011 |
| JP | 2005-512493 A | 4/2005 |
| JP | 2006-087288 A | 3/2006 |
| JP | 2007-300761 A | 11/2007 |
| JP | 2008-113542 A | 5/2008 |
| JP | 2011-091937 A | 5/2011 |
| KR | 10-0188009 B1 | 6/1999 |
| KR | 10-1022360 B1 | 3/2011 |

* cited by examiner

DEVICE FOR CONTROLLING A SWITCHING MODE POWER SUPPLY

TECHNICAL FIELD

Disclosed is an apparatus for controlling a switching mode power supply, and more particularly, an apparatus for controlling a switching mode power supply that uses a digital pulse width modulator (DPWM) of a digital control scheme when driving a switching mode power supply (SMPS) circuit to provide a load with a stable power supply voltage.

BACKGROUND ART

In general, all electronic equipment largely uses a voltage regulator module (VRM), such as a low drop-out (LDO) or a switching mode power supply (SMPS) to receive stable power supply voltage. However, the existing analog control method of VRM is complicated in design and has a limited range of application, which causes additional time and cost for developing the VRM. As an attempt to remove these shortcomings, recent studies have been largely conducted on a digital control based SMPS that does not require a large number of components except for an LC filter and a small number of discrete elements used to adjust an external output.

The digital SMPS has a superior immunity to changes in the power supply noise while ensuring superior steady-state and dynamic performance, and thus is implemented more easily than the analog SMPS. However, the digital SMPS requires a high operating frequency in order to improve the precision (resolution) of a digital pulse width modulator (DPWM) for stabilizing an output voltage. In order to reduce such a shortcoming, many studies have been conducted on a counter based DPWM, a delay line based DPWM and a hybrid DPWM. However, these DPWMs require a high operating frequency (high power) and a large surface area in order to ensure a high resolution duty ratio.

In order to remove the shortcomings of the DPWM controlled SMPS described above, recent studies have been conducted on delta-sigma (Σ-Δ) modulator schemes that operate at a low-power and high-frequency. However, these delta-sigma (Σ-Δ) modulator schemes use analog-digital converters (ADC) and thus are sensitive to influence from power supply voltage noise and noise distortion filter coefficients, thus having significantly low ADC performance. In addition, the delta-sigma (Σ-Δ) modulator schemes have a narrow voltage control loop bandwidth, and thus dynamic response characteristics need to be improved.

As a relevant technology, Korean Patent Publication No. 10-2010-0051881 (a switching mode power supply and method) discloses a switching mode power supply and a method thereof capable of stabilizing a voltage output from an SMPS circuit to prevent the system performance from being lowered due to increase in an output voltage ripple with a load change. In order to stabilize a voltage output from an SMPS circuit, information related to future load change is received and sampled, and in this case a digital pulse width modulator not using a switch-capacitor delay scheme is applied.

Korean Patent Publication No. 10-2009-0051143 (a self-calibration digital pulse-width modulator) discloses a hybrid type DPWM for stabilizing the switching frequency by enhancing the efficiency of a digitally controlled SMPS circuit. However, the hybrid type DPWM, by its nature, requires a high operating frequency (high power) and a large surface area for a high resolution duty ratio.

DISCLOSURE

Technical Problem

The present invention provides an apparatus for controlling a switching mode power supply which can return results similar to those of an open-loop control by using a new switched-capacitor delay based DPWM in which the high operating frequency, large surface area and dynamic response characteristics associated with a closed loop control scheme need not be considered.

The present invention provides an apparatus for controlling a switching mode power supply, the apparatus composed of a comparator comparing an output voltage with a reference voltage, a clock generator generating an internal chip operating frequency and a switching frequency of an SMPS circuit, a switched capacitor delay based DPWM that produces a result similar to that of an open loop control according to an output of the comparator, and a digital controller that are provided on a chip.

Technical Solution

According to an aspect of the present invention, there is provided an apparatus for controlling an output voltage of a switching mode power supply (SMPS) by adjusting a switching duty ratio, the apparatus including: a comparator configured to output a state signal varying depending on a comparison result between an output voltage of the SMPS and a reference voltage; a clock generator configured to generate an internal chip operating frequency and a switching frequency of the SMPS; a digital controller configured to determine on/off of current cells depending on the state signal input from the comparator; and a digital pulse width modulator (DPWM) configured to determine a duty ratio of a digital pulse width modulation signal by determining a charging/discharging time of an internal capacitor based on an amount of current of the current cell.

Advantageous Effects

According to the above-described aspects of the present invention, with respect to an apparatus for controlling a switching mode power supply circuit, an SMPS circuit using a new switched capacitor delay based DPWM can prevent a ringing phenomenon due to an over/under-shoot that may occur in an open loop control scheme, and can provide a load system with a stable power supply voltage without having to consider dynamic response characteristics of an SMPS circuit.

In addition, by providing a switched-capacitor delay based DPWM and a digital controller controlling the same, a high resolution duty ratio can be provided even if a chip internal operating frequency is low, and rapid operation of a clock generator can be prevented from causing power consumption and from serving as EMI source.

In addition, an apparatus for driving a switching mode power supply, such as SMPS, can externally set the switching frequency of a converter in a range between 1 MHz and 10 MHz depending on the applications used by a user, and can be freely implemented using an LC filter and a small number of discrete elements for adjusting an external output according to a desired amount of current supplied to a load and a selected switching frequency. In addition, since the apparatus is provided with a digital pulse width modulator, a Sepic or Flyback type converter as well as a buck/boost type can be composed using an LC filter and a small number of discrete elements for adjusting an external output.

Further, at each switching of a converter, a high current peak occurs, which serves as an EMI source. However, the switched-capacitor delay scheme based DPWM includes a boost mode circuit and an adaptive on-time circuit, thereby allowing a random spread spectrum clock (SSC) to be automatically provided without affecting an output voltage ripple.

MODE FOR INVENTION

The invention is described more fully hereinafter with reference to the accompanying drawings, in which exemplary embodiments of the invention are shown.

Figure 1:
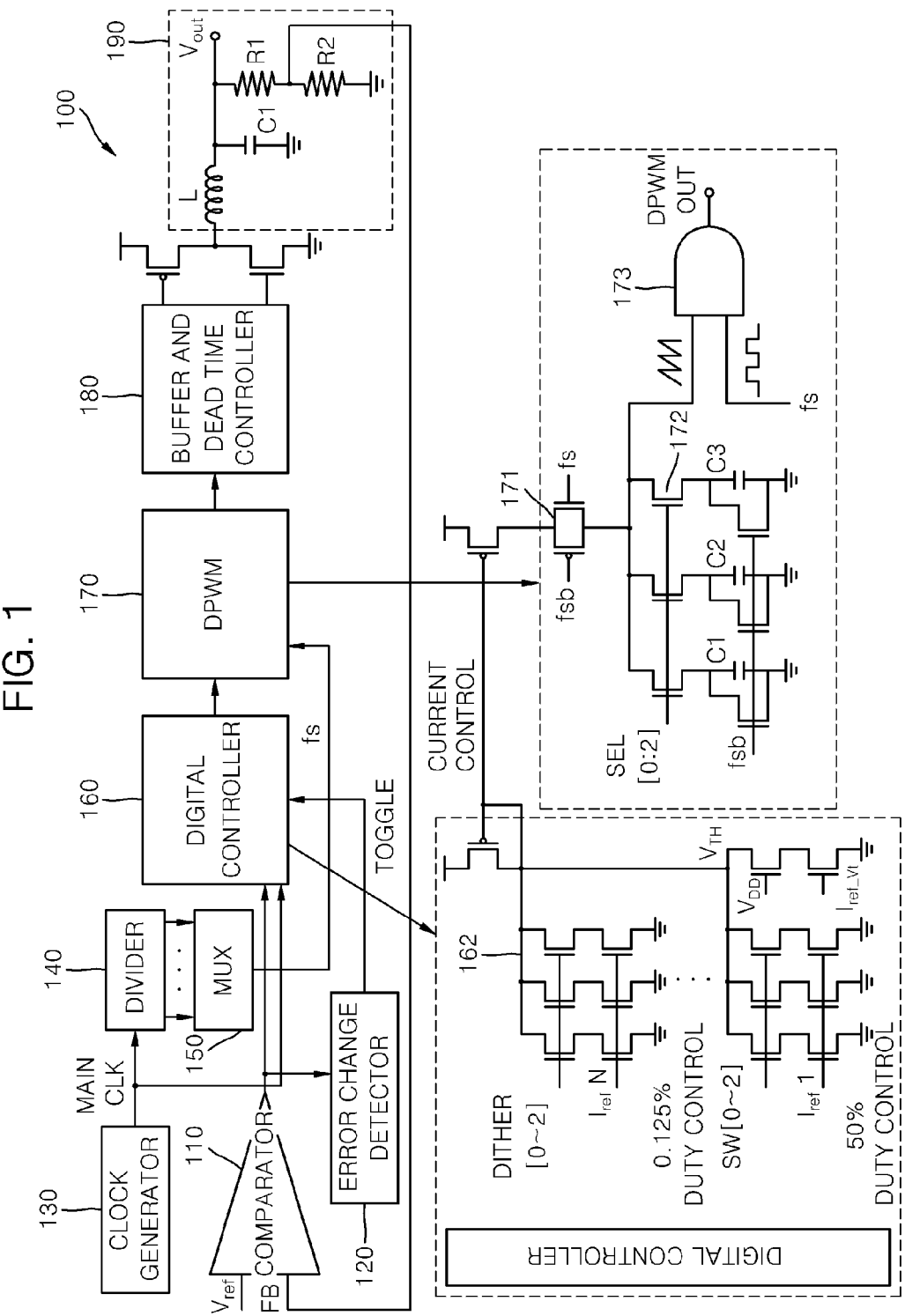
FIG. 1 is a block diagram illustrating a DC-DC converter of an apparatus for controlling a switching mode power supply according to the present invention.

FIG. 1 is a block diagram illustrating a DC-DC converter of an apparatus for controlling a switching mode power supply 100 according to the present invention.

An apparatus for controlling a switching mode power supply 100 includes a comparator 110, an error change detector 120, a clock generator 130, a divider 140, a multiplexer (MUX) 150, a digital controller 160, a digital pulse width modulator (DPWM) 170, a buffer and dead time controller 180, and an LC filter and a small number of discrete elements 190 for adjusting an external output. Although the LC filter and the small number of discrete elements are illustrated as elements for adjusting an external output in the DC-DC converter, the elements may be composed differently depending on the type of converter desired by a user.

The comparator 110 generates a high or low voltage depending on a result of comparison of an output voltage (feedback voltage: FB) and a reference voltage Vref, to determine an operation state of the digital controller 160. If the comparator 110 generates a high voltage, the digital controller 160 sequentially turns on current cells 162 to increase the amount of charging current in an internal capacitor 172, and if the comparator 110 generates a low voltage, sequentially turns off the current cells 162 to decrease the amount of charging current in the internal capacitor 172.

The error change detector 120 monitors an output signal of the comparator 110 and detects change in the output signal from low to high, or from high to low. That is, the error change detector 120 generates a toggle signal instantly when the output signal is changed from a past value to a present value. If an output voltage level becomes higher than a reference voltage, the past value is high and the present value is low. This state of having a high past value and a low present value is maintained unless the output voltage level becomes lower than the reference voltage.

The clock generator 130 is implemented as a clock generator configured to periodically supply pulses, and generates an internal chip operating frequency and a switching frequency fs of a switching mode power supply (SMPS). The clock generator 130 may generate a clock having a frequency of 100 MHz to drive the digital controller 160. The switching frequency fs of the SMPS is selected by a user. If the switching frequency fs is selected as 10 MHz, an internal clock configured to drive the digital controller 160 needs to be 100 MHz that is 10 times 10 MHz. Meanwhile, if a user selects the switching frequency fs of 1 MHz, an internal clock to drive the digital controller 160 needs to be 10 MHz that is 10 times 1 MHz. To this end, a ¹⁄₁₀ frequency is generated by the divider 140 and used as an internal clock. That is, the digital controller 160 operates at an operating frequency (Main CLK) 10 times the switching frequency fs.

The digital controller 160 controls on/off of the current cells 162 according to the output signal state (high/low) of the comparator 110. The total amount of current of the current cells 162 determined by the digital controller 160 determines a slope of the voltage of the internal capacitor 172 of the DPWM 170.

The DPWM 170 determines a charging/discharging time of the internal capacitor 172 based on the switching frequency set by the divider 140 and the MUX 150 based on the amount of current of the current cell 162, and determines a duty ratio of a digital pulse width modulation signal. In this case, the capacitance of the internal capacitor 172 may be determined by a user according to a switching frequency fs desired to be used by the user. That is, a rising slope (ramp signal) of a voltage due to current charged in the internal capacitor 172 is controlled through selection of the internal capacitor 172, and if the controlled voltage of the internal capacitor 172 and the voltage of the operating frequency (Main CLK) each reach a logic threshold voltage, a digital pulse width modulation signal is generated by an AND gate 173. The duty ratio of the digital pulse width modulation signal is determined in proportion to the time for the voltage of the internal capacitor 172 to reach the logic threshold voltage. That is, the time taken to reach the logic threshold voltage varies depending on the total amount of current of the current cell 162. The voltage of the internal capacitor 172 rapidly reaches the logic threshold voltage if the total amount of current is great, and slowly reaches the logic threshold voltage if the total amount of current is small.

The buffer and dead time controller 180 prevents driving voltage of an on-chip or off-chip power trail and short circuit. The LC filter and the small number of discrete elements 190 may be provided in various configurations depending on an output voltage level, a switching frequency and an amount of current supplied to a load that are selected by a user.

Figure 2:
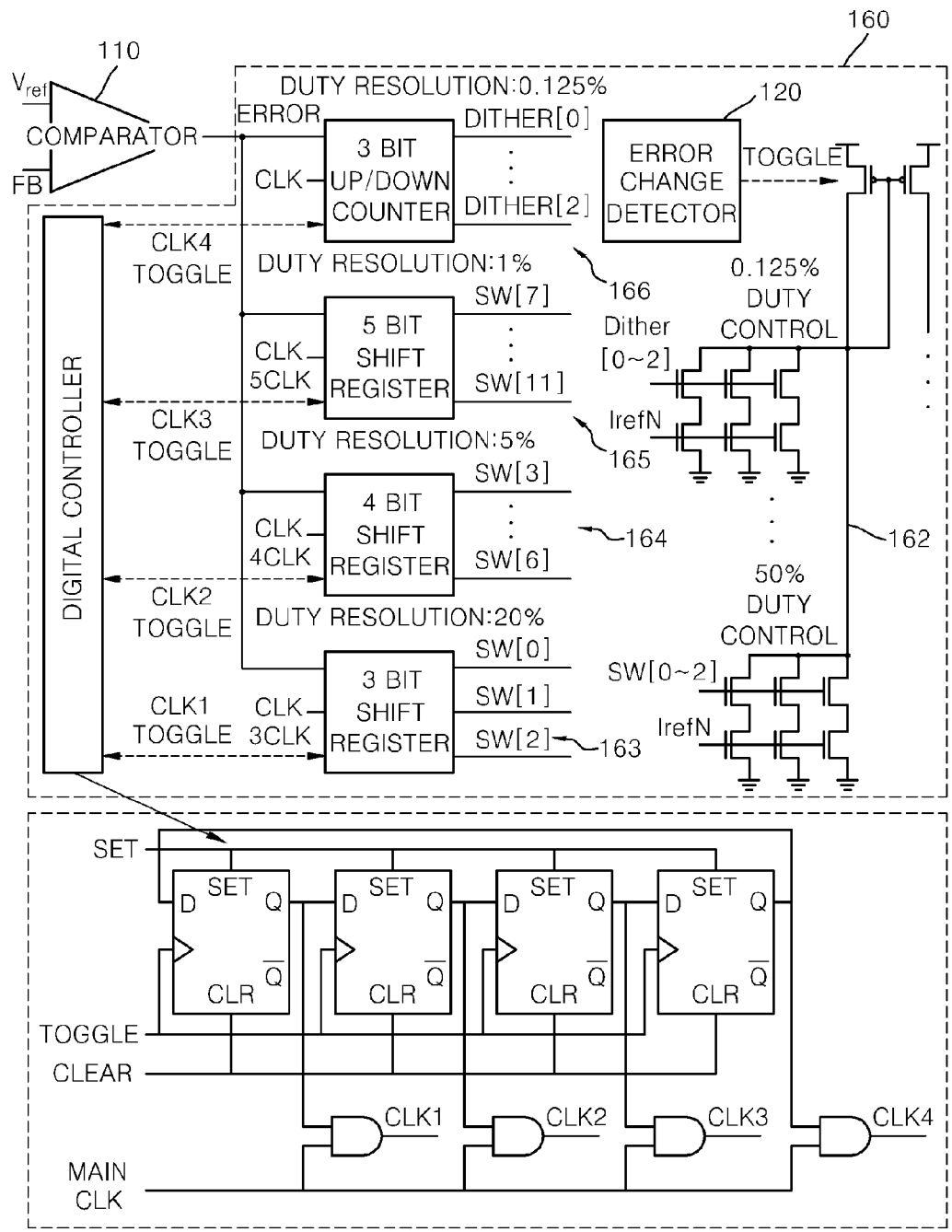
FIG. 2 is a circuit diagram illustrating a digital controller and current cells according to the present invention.

FIG. 2 is a circuit diagram illustrating the digital controller 160 and the current cells 162 according to the present invention in detail.

The digital controller 160 determines the current cell 162 for controlling a voltage slope of the internal capacitor 172 of the DPWM 170 according to an output signal input from the comparator 110. In addition, the DPWM 170 controls a rising slope of the voltage of the internal capacitor 172 according to the amount of current of the current cell 162 determined by the digital controller 160.

The rising slope of the voltage of the internal capacitor 172 is controlled through the following four operations. First, the comparator 110 compares an output voltage FB determined by a chip outside L-C filter with a chip inside reference voltage Vref. According to an output signal of the comparator 110 depending on a voltage difference, the first block, i.e., a 3 bit shift register 163, operates and determines an initial duty ratio of a digital pulse width modulation signal with a duty resolution of 20%. In a state of all high or all low of the 3 bit shift register 163, the 3 bit shift register 163 generates a toggle signal, and changes the setting state of the digital controller 160, thereby allowing the second block, i.e., a 4 bit shift register 164, to operate. In addition, if a change occurs in the comparison result between the output voltage FB and the reference voltage Vref, the error change detector 120 generates a toggle signal, and changes the setting state of the digital controller 160, thereby allowing the second block, i.e., the 4 bit shift register 164, to operate. The change in the comparison result of the output voltage FB and the reference voltage Vref represents that the output voltage level has become higher or lower than a desired voltage level, and thus the output voltage needs to be sensed again with a higher resolution, for which the 4 bit shift register 164 is operated. The 4 bit shift register 164 controls the duty ratio of the digital pulse width modulation signal again with a duty resolution of 5%. If the operation of the 4 bit shift register 164 is completed, an operation of a 5 bit shift register 165 is subsequently allowed. If the sensing operation of the 5 bit shift register 165 is completed, a stable output voltage is provided to a load through a 3 bit up/down counter 166, which is the final block, with a duty resolution of 0.125%.

Figure 4:
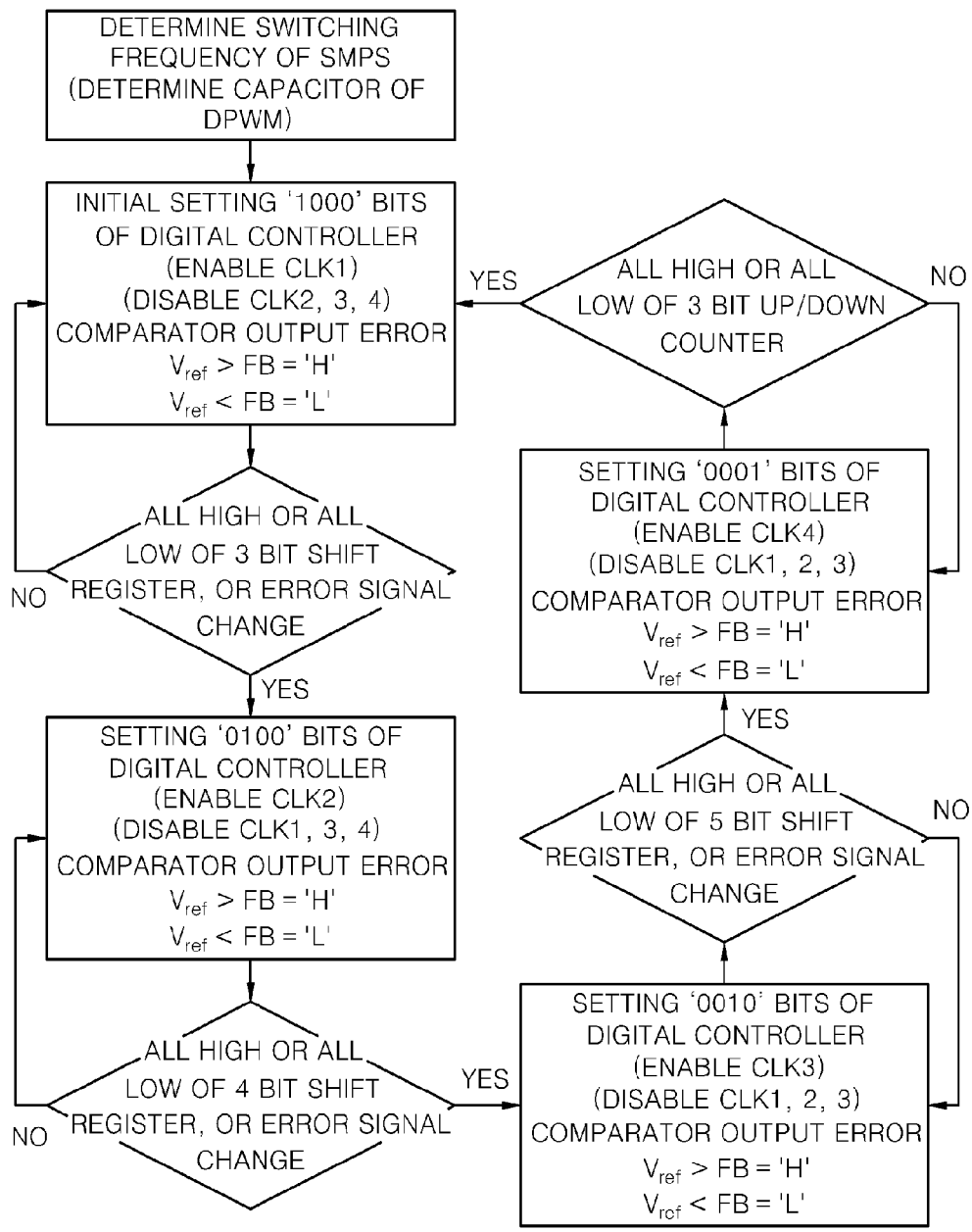
FIG. 4 is a flowchart showing the sequence of operation of the digital controller configured to generate a digital pulse width modulation signal according to the present invention.

The digital controller 160 is composed of a 4 bit ring counter and four AND gates. Since an initial state of the 4 bit ring counter is set to '1000' bits, a system frequency CLK1 is output only from a first AND gate. CLK1 is applied to the 3 bit shift register 163 as an operating frequency and performs control at a duty resolution of 20%. If the 3 bit shift register 163 has all high/all low during its operation and thus the next register block needs to operate, or if a change occurs in the high/low output signal of the comparator 110 and thus the output needs to be sensed with a higher solution, the 3 bit shift register 163 and the error change detector 120 each generate toggle signals, thereby changing the 4 bit ring counter into '0100' bit. That is, CLK1 stops, and CLK2 starts operating. An output of the 4 bit ring counter is sequentially changed by a toggle signal generated from each register block, and an operating frequency is applied only to a register block corresponding to the change, thereby enabling or disabling each register block. If an output voltage level is not sensed until 3 bit outputs of the 3 bit up/down counter 166 are all high/all low, the 3 bit up/down counter 166 stops operating, and the 4 bit ring counter resumes the initial state '1000' bits to repeat the above operations starting from the operation of the 3 bit shift register 163. Such a flow of operations of the digital controller 160 is shown in FIG. 4.

Figure 3:
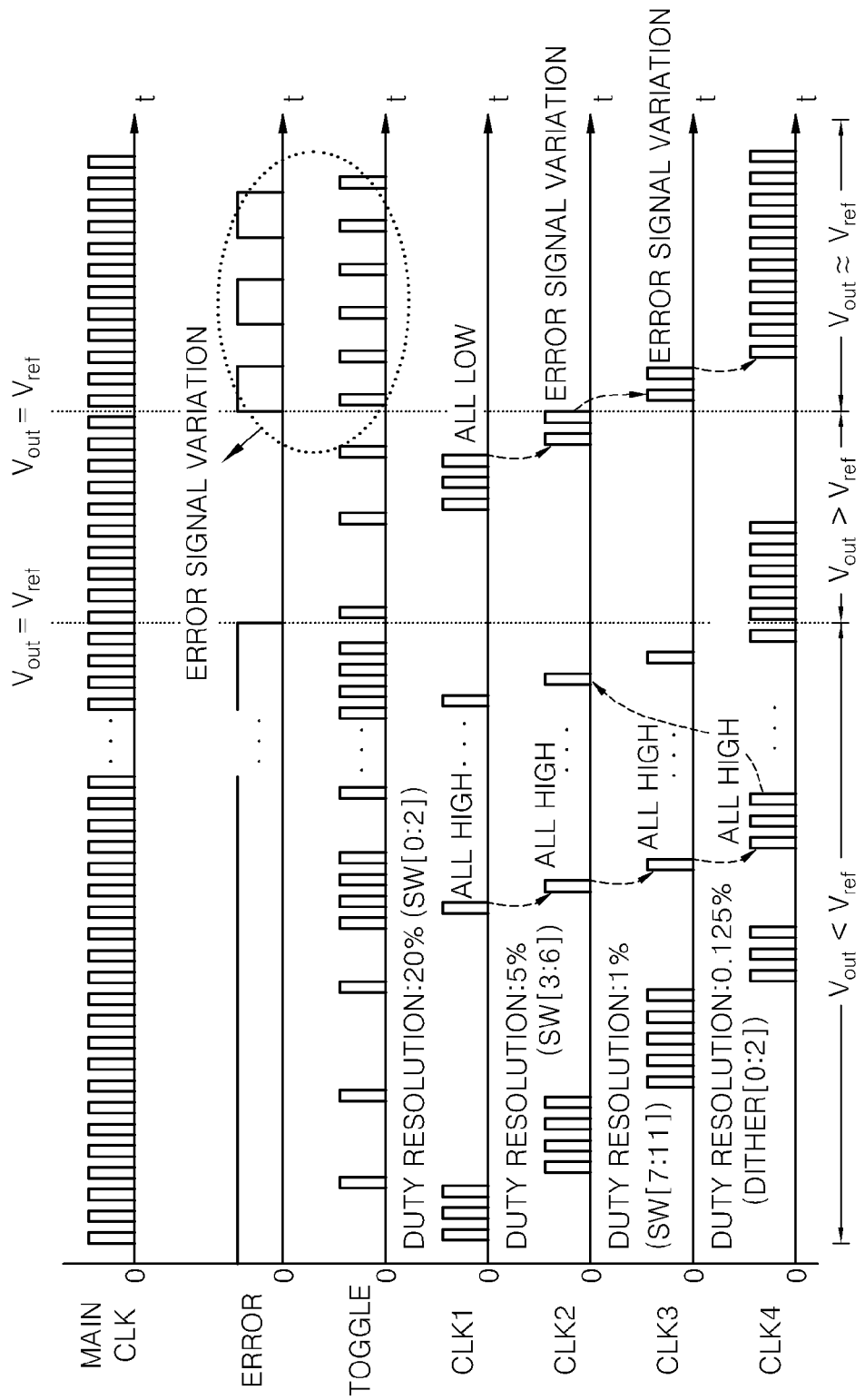
FIG. 3 is a timing diagram of a digital controller configured to generate a digital pulse width modulation signal according to the present invention.

FIG. 3 is a timing diagram of the digital controller 160 configured to generate a digital pulse width modulation signal according to the present invention. A main CLK is an internal chip operating frequency, which is 10 times a switching frequency generated by the clock generator 130, the divider 140 and the MUX 150. The main CLK generated by the clock generator 130 is used as a clock of the digital controller 160. An error is an output signal of the comparator 110, and according to comparison between an output voltage and a reference voltage, the comparator 110 outputs a high/low signal. The digital controller 160, at a high signal, sequentially turns on the current cells 162 to increase the amount of charging current of the internal capacitor 172, and at a low signal, sequentially turns off the current cells 162 to decrease the amount of discharging current of the internal capacitor 172. The toggle signal, CLK1, CLK2, CLK3 and CLK4 are controlled by the digital controller 160, and operated in the sequence described above.

Figure 5:
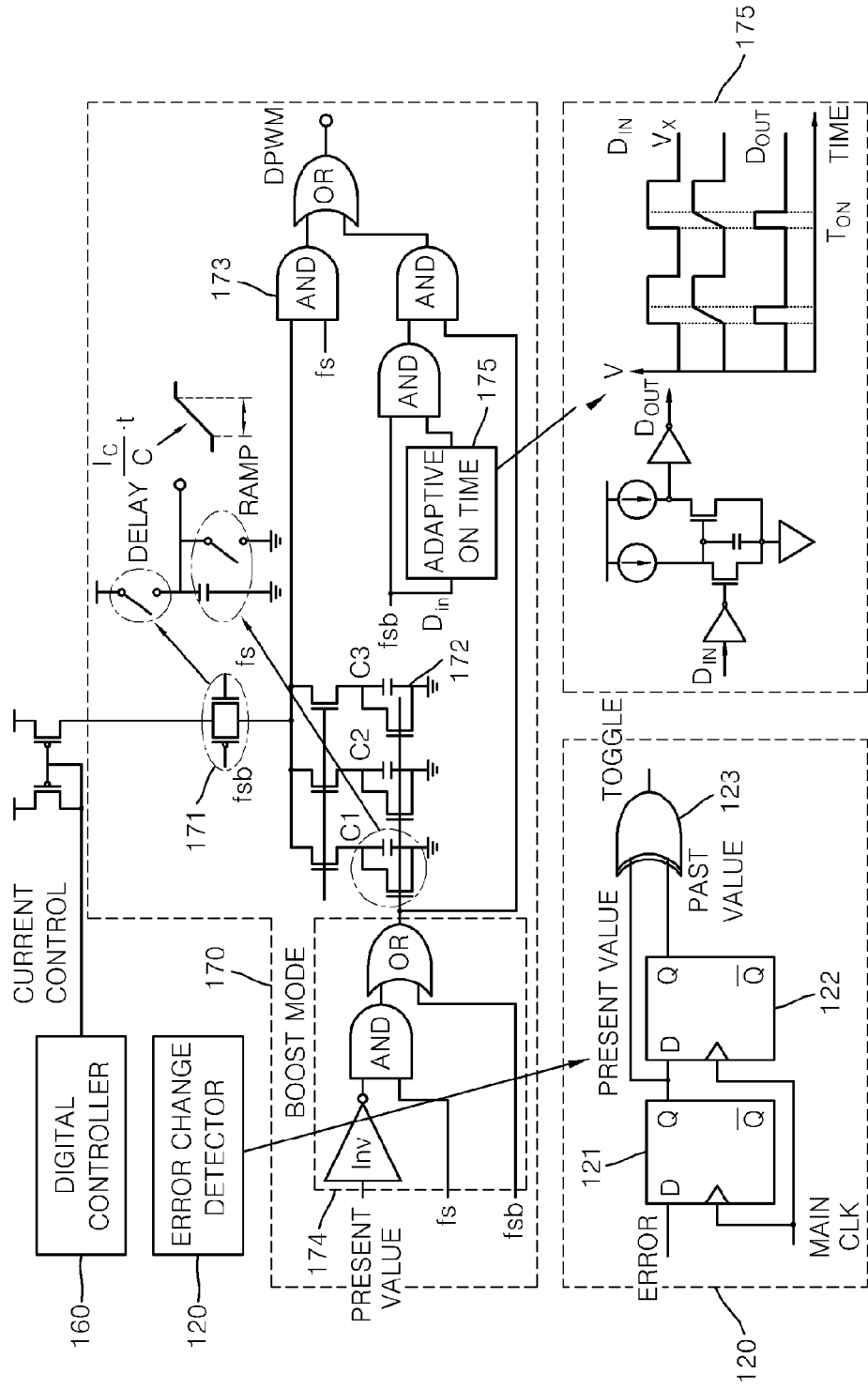
FIG. 5 is a view illustrating a digital pulse width modulator (DPWM) including a boost mode circuit according to the present invention.

FIG. 5 is a view illustrating the DPWM 170 including a boost mode circuit 174 and an adaptive on-time circuit 175 according to the present invention.

The DPWM 170 controls a slope of the voltage of the internal capacitor 172 according to the amount of charging current and the charging time of the internal capacitor 172. Based on the current supplied to the internal capacitor 172, on/off of each current cell 162 is determined by the digital controller 160 depending on a difference between an output voltage and a reference voltage. The capacitance of the internal capacitor 172 is determined by a user through Sel [0:2] based on a desired switching frequency of the SMPS. That is, a rising slope of the voltage due to current charged in the internal capacitor 172 through selection of the internal capacitor 172 is controlled, and if a voltage of the controlled internal capacitor 172 and a voltage of the switching frequency fs each reach a logic threshold voltage, a digital pulse width modulation signal is generated. A duty ratio of a digital pulse width modulation signal is determined in proportion to the time taken for the voltage of the internal capacitor 172 to reach a logic threshold voltage. The switching frequency fs is 1/10 of the internal operating frequency Main CLK so as to be the same as a clock applied to the charging/discharging switch 171, which leads to a triangular wave signal of the voltage of the internal capacitor 172 matching the switching frequency.

The rising voltage of the internal capacitor 172 is calculated through Equation 1. In order for the switching frequency fs of 10 MHZ (100 ns) to have a duty ratio of 90%, the capacitor voltage needs to reach a logic threshold voltage within 10 ns. In this case, the current needed to be supplied is calculated as 63 uA according to Equation 1. In order to have duty ratios of 60% and 6%, 4.2 uA and 1.7 uA are supplied, respectively. That is, if the capacitance of the internal capacitor 172 is capable of being changed according to a desired switching frequency, the duty ratio of the switching frequency is easily controlled with each amount of current.

$$V(t) = I_c/C \times t \qquad \text{[Equation 1]}$$

V(t) is a capacitance voltage according to a charging time, Ic is current charged in the capacitor, C is capacitance, and t is a charging time.

In addition, the DPWM 170 may control a duty ratio within a range of 6% to 90% when a switching frequency of 1 MHz to 10 MHz is desired. In addition, the maximum amount of current charged in the internal capacitor 172 of the DPWM 170 is 63 uA (at a duty ratio of 90%), and the minimum amount of current charged in the internal capacitor 172 is 1.7 uA (at a duty ratio of 6%). In addition, a current reference circuit is used to prevent errors in a capacitor voltage slope control due to current change with voltage and temperature change.

In addition, a duty ratio determined by the DPWM 170 is not instantly used in response to a change in the output voltage of the apparatus for controlling the SMPS 100, but needs to wait for the next pulse. Accordingly, in order to minimize an output voltage ripple, the DPWM 170 includes the boost mode circuit 174 and the adaptive on-time circuit 175. The boost mode circuit 174 and the adaptive on-time circuit 175 start operating using the error change detector 120. The error change detector 120 stores a past value of the output signal and a present value of the output signal in flip-flops 121 and 122, respectively, and generates a toggle signal through an EX-OR gate 123 only when the two values become different from each other. If an output voltage level becomes higher than a reference value, the past value is high, and the present value is low. Unless the output voltage level becomes lower than the reference value, this state is maintained indefinitely. If the state of an output voltage level being higher than a reference value is maintained for a long time, a ripple of the output voltage may increase. Accordingly, if the present value is low, the boost mode circuit 174 generates a discharge signal forcedly discharging the internal capacitor 172 to prevent an increase in the duty ratio of a digital pulse width modulation signal that occurs when the internal capacitor 172 is charged at a high state of the switching frequency fs.

When using only the boost mode circuit 174, there is a limitation on controlling the DPWM 170. When the low present value is maintained (Vout>Vref) even after a switching cycle is changed, the boost mode circuit 174 continually allows the internal capacitor 172 to be discharged, which achieves a fast reduction in the output voltage but fails to maintain the original frequency speed in the switching frequency fs, thereby leading to reduction in the frequency speed. The reduction in speed of the switching frequency prevents the ripple of the output voltage of the SMPS, but requires an inductor to be larger than an inductor that is determined according to the switching frequency fs and the amount of current supplied to a load when the SMPS is configured. In addition, when there is a need to increase a duty ratio after the output voltage becomes lower than the reference voltage by the boost mode circuit 174, if a low discharge signal becomes low shortly before the next cycle of the digital pulse width modulation signal and time to sufficiently charge the internal capacitor 172 is insufficient, the voltage of the internal capacitor 172 remains low.

In order to prevent a speed of the switching frequency fs from being reduced due to the boost mode circuit 174, the adaptive on time circuit 175 is provided to generate a pulse having a minimum duty width that minimizes output voltage ripples at each switching frequency fs if the digital pulse modulation signal is not generated at each switching frequency fs due to the boost mode circuit 174.

Figure 6:
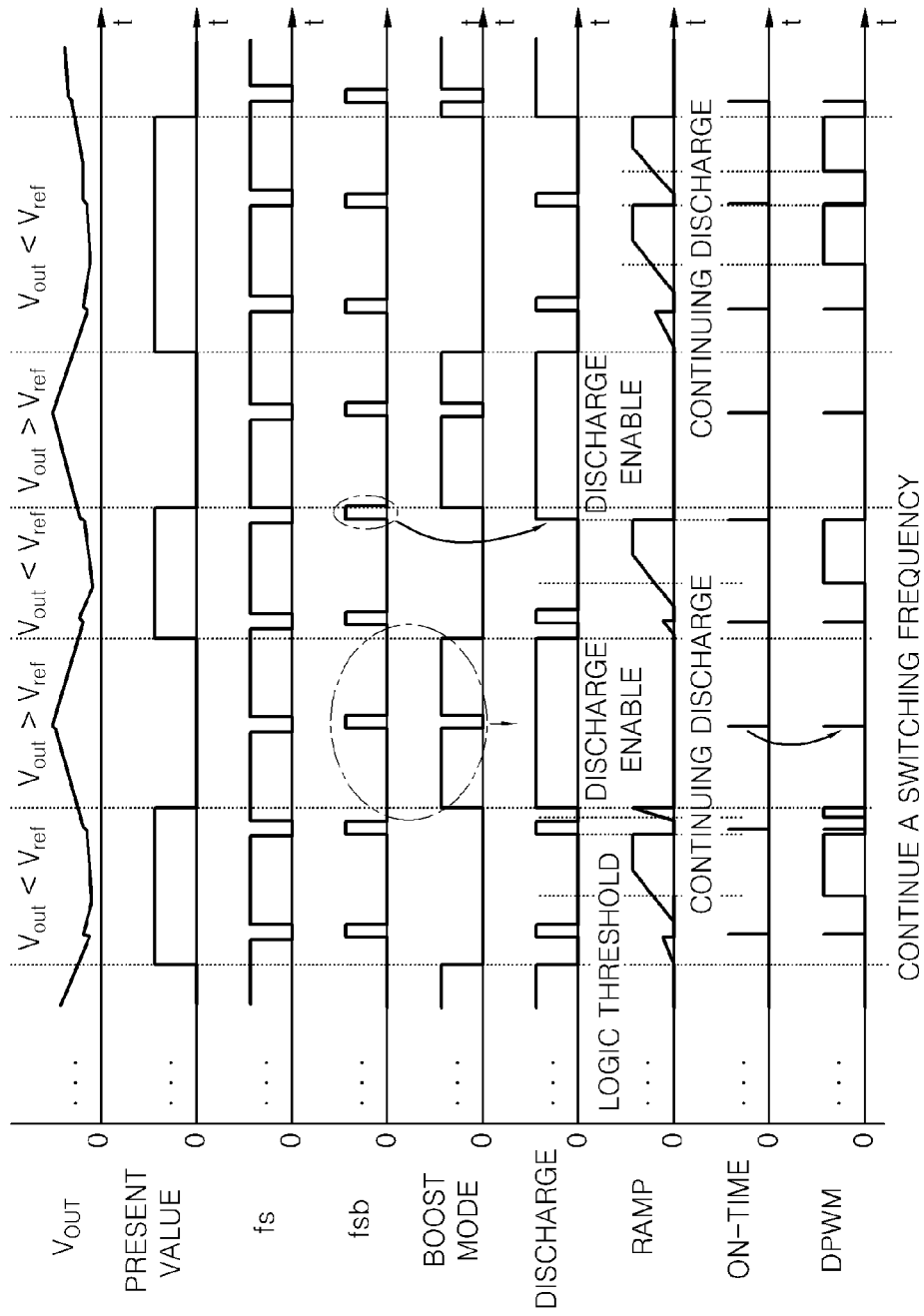
FIG. 6 is a graph showing a result of an experiment employing a boost mode circuit and an adaptive on-time circuit of the DPWM according to the present invention.

FIG. 6 is a graph showing a result of an experiment employing the boost mode circuit 174 and the adaptive on-time circuit 175 of the DPWM 170 according to the present invention. The digital pulse width modulation signal generated by the DPWM 170 using the boost mode circuit 174 and the adaptive on time circuit 175 provides a random spread spectrum clock (SSC) function, which prevents high current peak from occurring in each switching operation of the SMPS circuit and serving as an EMI source.

Figure 7:
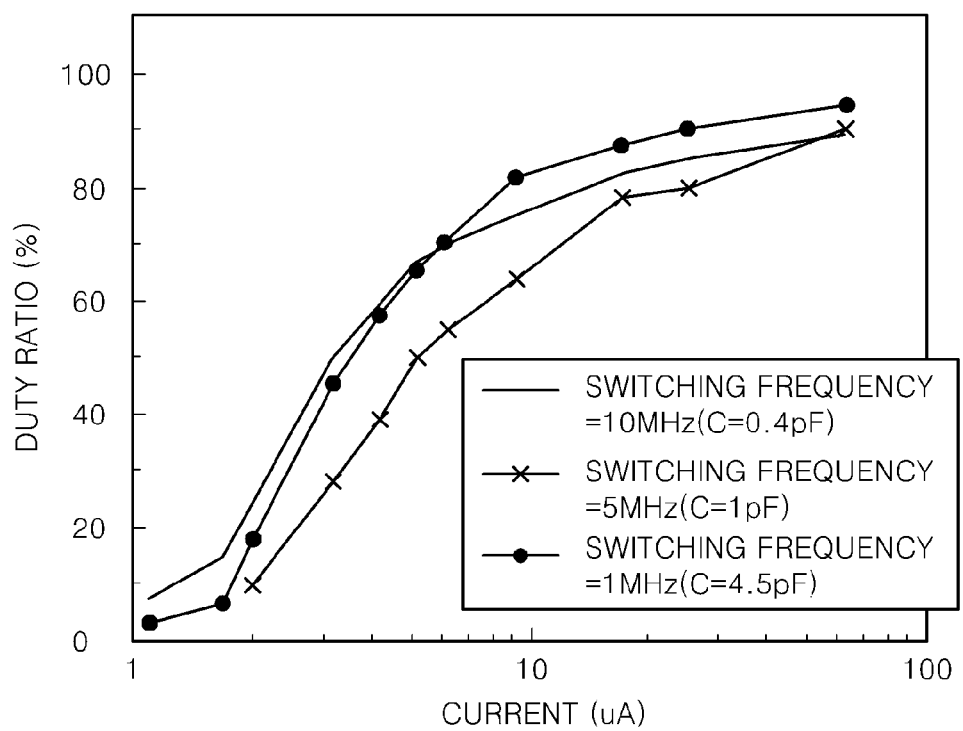
FIG. 7 is a graph of an experiment result that shows change in duty ratio with different switching frequencies and different amounts of charging current.

FIG. 7 is a graph of an experiment result that shows change in duty ratio with different switching frequencies and different amounts of charging current of the DPWM 170 according to the present invention. When a Sel [0:2] signal is used, the internal capacitor 172 is set to a capacitance of 0.4 pF for a switching frequency of 10 MHz, a capacitance of 1 pF for a switching frequency of 5 MHz, and a capacitance of 4.5 pF for a switching frequency of 1 MHz. The switching frequency is set to a range between 1 MHz and 10 MHz in consideration of the area taken by the internal capacitor 172. That is, if a switching frequency is set to 1 MHz or lower, the capacitance of the internal capacitor 172 is increased (20 pF is required for a switching frequency of 200 KHz according to Equation 1). Accordingly, when the switching frequency is set to 1 or lower, an off-chip capacitor may be used to reduce costs. In contrast, in order to set a switching frequency of 10 MHz or higher, the capacitance of the internal capacitor 172 needs to be lower than 0.4 pF. However, in consideration of the process variations, reducing the internal capacitor 172 is not desirable.

Figure 8:
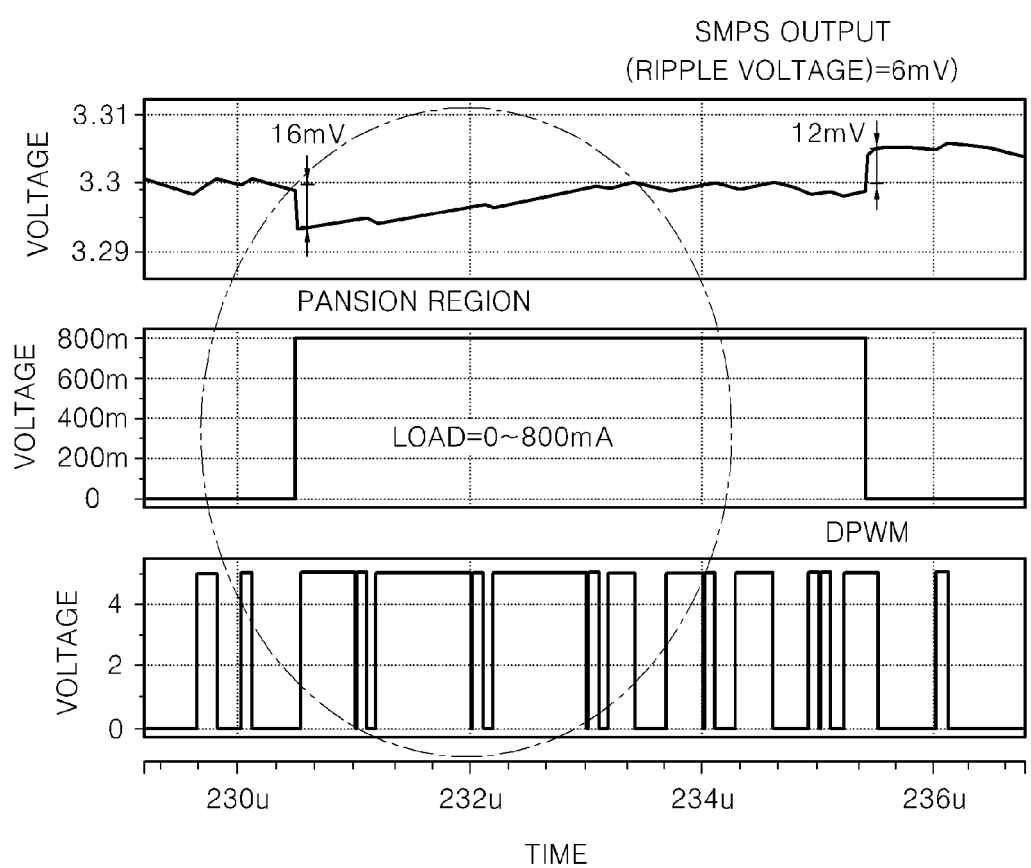
FIGS. 8 to 12 are graphs showing a simulation result of the DC-DC converter of the apparatus for controlling a switching mode power supply according to the present invention.
Figure 9:
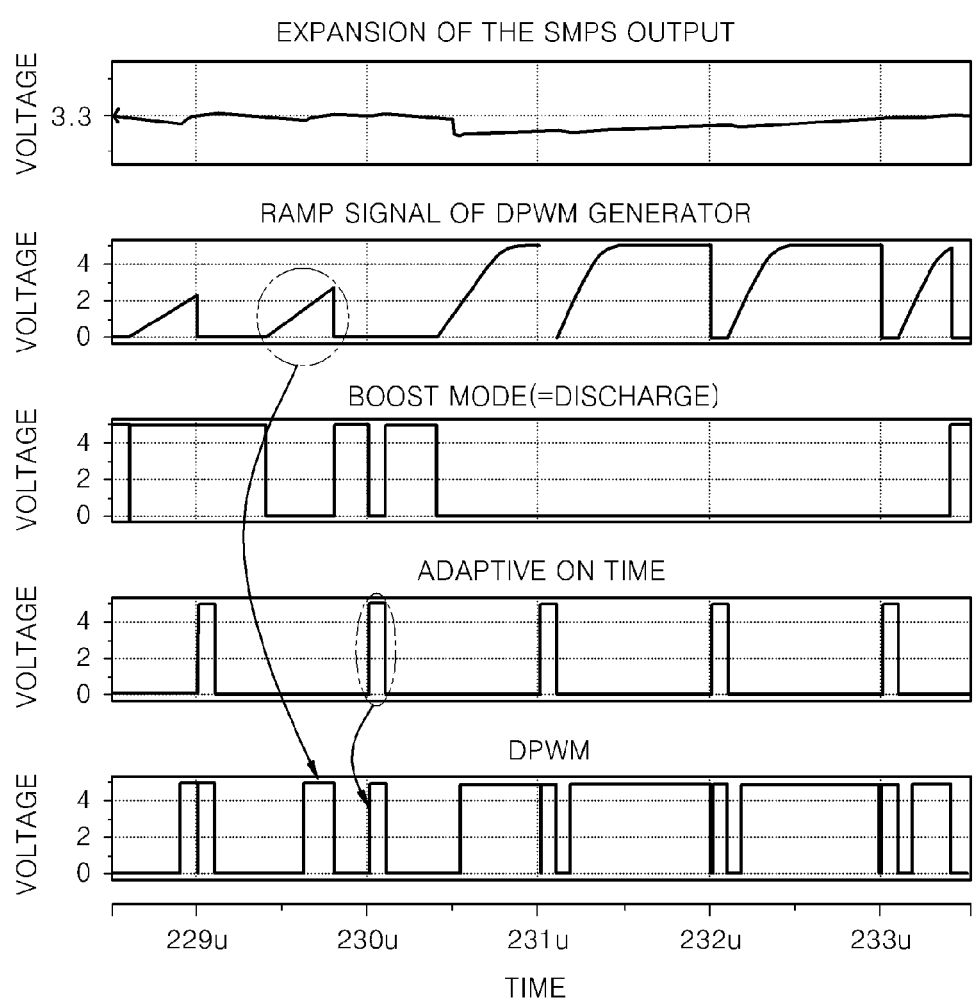
Figure 10:
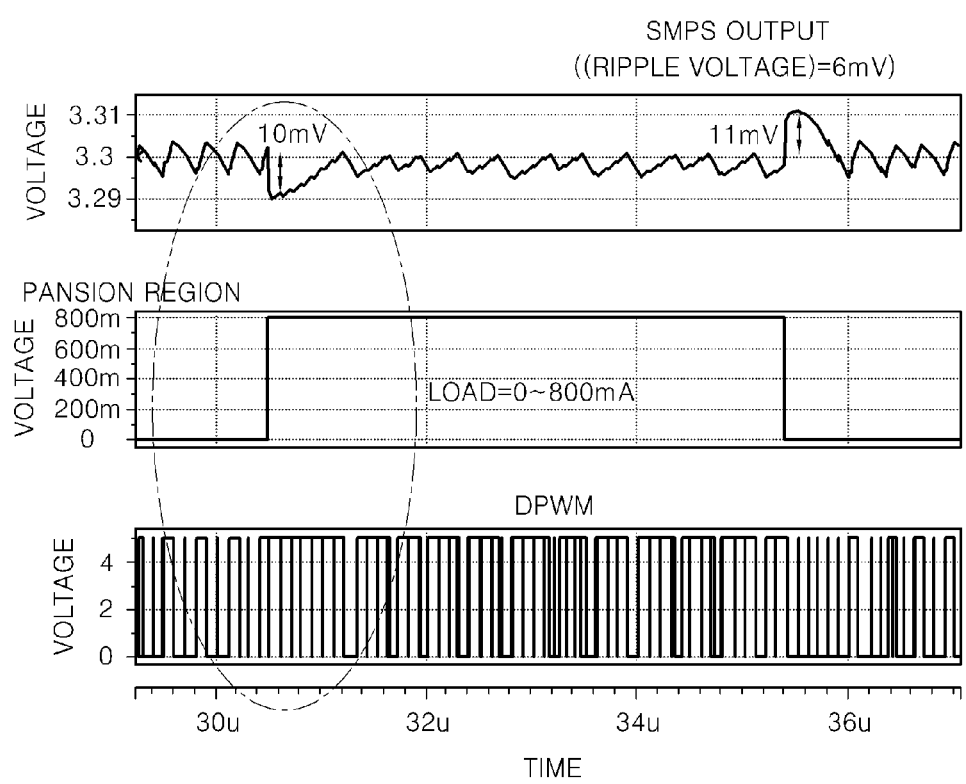
Figure 11:
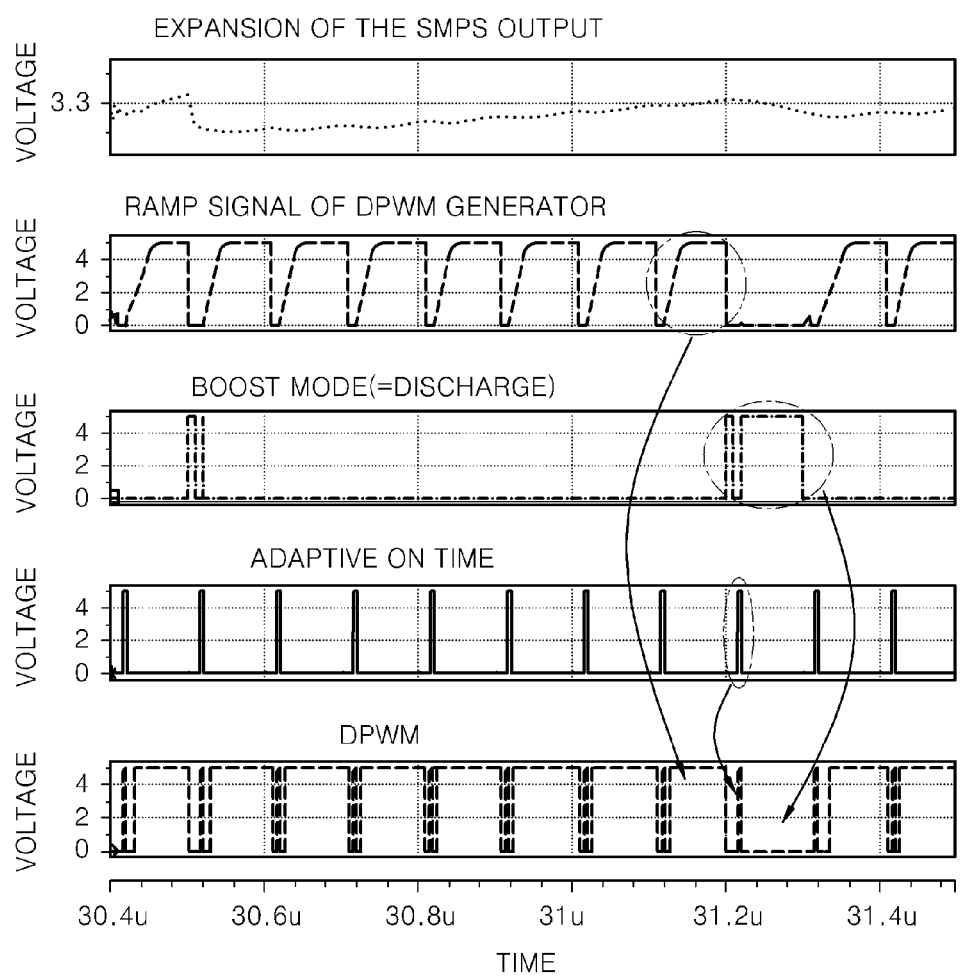
Figure 12:
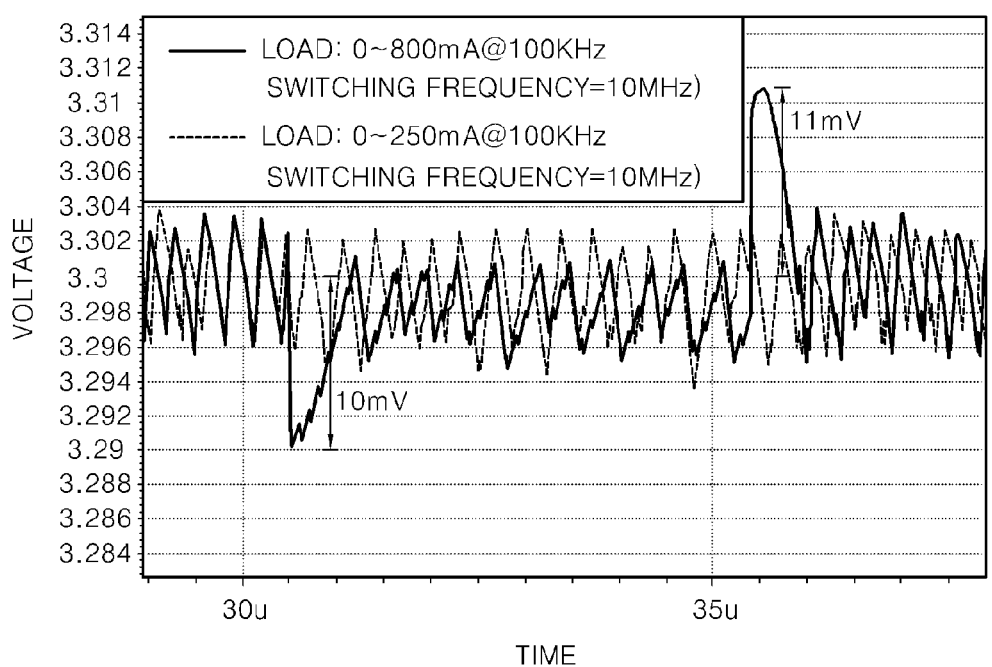

FIGS. 8 to 12 are graphs showing a simulation result of the DC-DC converter of the apparatus for controlling the SMPS 100 according to the present invention. FIGS. 8 and 9 show a simulation result of a transient response of an SMPS circuit using the DPWM 170 having a switching frequency of 1 MHz when a load regulation with 0 mA to 800 mA and 100 KHz occurs in the SMPS circuit. FIGS. 10 and 11 show a simulation result of a transient response of an SMPS circuit using the DPWM 170 having a switching frequency of 10 MHz when a load regulation with 0 mA to 800 mA and 100 KHz occurs in the SMPS circuit. As shown in FIGS. 8 to 12, ringing due to over/under-shooting does not occur. FIG. 12 shows a simulation result of an over/under-shoot of an SMPS circuit having a switching frequency of 10 MHz when a load regulation with 0 mA to 800 mA and 100 KHz and a load regulation with 0 mA to 250 mA and 100 KHz occur in the SMPS circuit. As shown in FIG. 12, ringing due to over/under-shooting does not occur.

The disclosure can also be embodied as computer readable codes on a computer readable recording medium. Also, functional programs, codes, and code segments for accomplishing the present invention can be easily construed by programmers skilled in the art to which the present invention pertains. The computer readable recording medium is any data storage device that can store data which can thereafter be read by a computer system. Examples of the computer readable recording medium include a read-only memory (ROM), a random-access memory (RAM), CD-ROMs, magnetic tapes, floppy disks, optical data storage devices, and carrier waves such as data transmission through the Internet. The computer readable recording medium can also be distributed over network-coupled computer systems so that the computer readable codes are stored and executed in a distributed fashion.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

The invention claimed is:

1. An apparatus for controlling an output voltage of a switching mode power supply (SMPS) by adjusting a switching duty ratio, the apparatus comprising:
    a comparator outputting a state signal varying in response to a comparison result between an output voltage of the SMPS and a reference voltage;
    a clock generator generating an internal chip operating frequency and a switching frequency of the SMPS;
    a digital controller determining on or off status of at least one cell depending on the state signal from the comparator; and
    a digital pulse width modulator (DPWM) determining a duty ratio of a digital pulse width modulation signal by determining a charging or discharging time of an internal capacitor based on an amount of current of the at least one cell;
    wherein the rising of the voltage of the internal capacitor is calculated by Equation A below:

$$V(t)=(I_c/C) \times t \qquad \text{[Equation A]}$$

wherein V(t) is a capacitance voltage according to a charging time, $I_c$ is current charged in the internal capacitor, C is capacitance, and t is the charging time.

2. The apparatus of claim 1, wherein the DPWM controls a rising slope of a voltage of the internal capacitor according to the amount of current of the at least one cell determined by the digital controller.

3. The apparatus of claim 2, wherein the DPWM determines an initial duty ratio of the digital pulse width modulation signal with a first duty resolution by operating a 3 bit shift register according to the state signal from the comparator, changes a state of the digital controller such that the duty ratio of the digital pulse width modulation signal is controlled with a second duty resolution which is lower than the first duty resolution by allowing a 4 bit shift register to operate if the state signal from the comparator is changed, allows a 5 bit shift register to operate if the operation of the 4 bit shift register is completed, and supplies a load with a stable output voltage through a 3 bit up or down counter with a third duty resolution lower than the second resolution if the operation of the 5 bit shift register is completed.

4. The apparatus of claim 3, wherein the 3 bit shift register generates a toggle signal in a state of all-high or all-low of the 3 bit shift register, so that the state of the digital controller is changed, thereby allowing the 4 bit shift register to operate.

5. The apparatus of claim 1, wherein the duty ratio of the digital pulse width modulation signal is determined to be proportional to a time that a voltage of the internal capacitor reaches a logic threshold voltage.

6. The apparatus of claim 1, wherein the internal capacitor has a capacitance varying in response to a predetermined switching frequency.

7. The apparatus of claim 1, wherein the digital controller controls the duty ratio with an internal operating frequency that is 10 times a switching frequency of a converter.

8. An apparatus for controlling an output voltage of a switching mode power supply (SMPS) by adjusting a switching duty ratio, the apparatus comprising:
a comparator outputting a state signal varying in response to a comparison result between an output voltage of the SMPS and a reference voltage;
a clock generator generating an internal chip operating frequency and a switching frequency of the SMPS;
a digital controller determining on or off status of at least one cell in response to the state signal from the comparator; and a digital pulse width modulator (DPWM) determining a duty ratio of a digital pulse width modulation signal by determining a charging or discharging time of an internal capacitor based on an amount of current of the at least one cell, wherein the DPWM comprises:
a boost mode circuit discharging the voltage of the internal capacitor to reduce a ripple of the output voltage; and
an adaptive on-time circuit preventing from a reduction in a speed of the switching frequency due to the boost mode circuit.

9. The apparatus of claim 8, wherein the adaptive on-time circuit generates a pulse having a minimum duty ratio that minimizes the ripple of the output voltage at each switching frequency if the digital pulse width modulation signal is failed to be generated at each switching frequency due to the boost mode circuit.

10. The apparatus of claim 8, wherein the digital pulse width modulation signal generated from the DPWM by the boost mode circuit and the adaptive on-time circuit provides a random spread spectrum clock (SSC).

11. An apparatus for controlling an output voltage of a switching mode power supply (SMPS) by adjusting a switching duty ratio, the apparatus comprising:
a comparator outputting a state signal varying in response to a comparison result between an output voltage of the SMPS and a reference voltage;
a clock generator generating an internal chip operating frequency and a switching frequency of the SMPS;
a digital controller determining on or off status of at least one cell in response to the state signal from the comparator; and a digital pulse width modulator (DPWM) determining a duty ratio of a digital pulse width modulation signal by determining a charging or discharging time of an internal capacitor based on an amount of current of the at least one cell, wherein, if a first control signal is input from the comparator, the digital controller sequentially turns on the at least one cell to increase the amount of charging current of the internal capacitor, and if a second control signal is input from the comparator, sequentially turns off the at least one cell to decrease the amount of charging current of the internal capacitor.

12. The apparatus of claim 11, wherein the first control signal corresponds to a high signal output as the output voltage of the SMPS is lower than the reference voltage, and the second control signal corresponds to a low signal output as the output voltage of the SMPS is higher than the reference voltage.

* * * * *